United States Patent [19]
Norimatsu

[11] Patent Number: 5,621,785
[45] Date of Patent: Apr. 15, 1997

[54] PORTABLE TELEPHONE SET TRANSMITTING AREA IDENTIFICATION SIGNAL INDICATIVE OF A RADIO ZONE OCCUPIED THEREBY

[75] Inventor: Noriko Norimatsu, Tokyo, Japan

[73] Assignee: NEC Corporation, Tokyo, Japan

[21] Appl. No.: 628,293

[22] Filed: Apr. 5, 1996

[30] Foreign Application Priority Data

Apr. 5, 1995 [JP] Japan .................................. 7-079243

[51] Int. Cl.⁶ ...................................... H04Q 7/22
[52] U.S. Cl. ............................ 379/59; 379/58; 455/33.1; 455/56.1
[58] Field of Search ................................ 379/58, 59, 60; 455/33.1, 56.1, 33.2, 54.1

[56] References Cited

U.S. PATENT DOCUMENTS

| | | | |
|---|---|---|---|
| 3,808,537 | 4/1974 | Sarati et al. | 379/58 |
| 5,257,399 | 10/1993 | Kallin et al. | 455/33.1 |
| 5,257,406 | 10/1993 | Ito | 455/56.1 |

OTHER PUBLICATIONS

AKERBERG, "Properties of a TDMA Pico Cellular Office Communication System", IEEE Mar. 1988.

Primary Examiner—William Cumming
Attorney, Agent, or Firm—Whitham, Curtis, Whitham & McGinn

[57] ABSTRACT

In a mobile communication system comprising a plurality of base stations disposed in respective radio zones, a portable telephone set (20) comprises a radio transmission/reception section (24) for receiving a first area identification signal transmitted from a first base station. A main RAM (22) holds the first area identification signal as a current area identification signal. Responsive to an incoming call signal for the first base station, a main CPU (21) determines whether or not a user of the portable telephone set answers to the incoming call signal within a predetermined time interval elapsed since the incoming call signal is received. The main CPU (21) ensures one of the voice channels as an ensured voice channel by carrying out an automatic answering for the incoming call signal when the user does not answer to the incoming call signal within the predetermined time interval. The radio transmission/reception section (24) transmits the current area identification signal stored in the main RAM (22) on the ensured voice channel.

12 Claims, 11 Drawing Sheets

| CHANNEL NUMBER | EQUIVALENT 2'S COMPLEMENT NUMBER | 11-bit BINARY REPRESENTATION | MOBILE STATION RECEIVE FREQUENCY | LAND STATION RECEIVE FREQUENCY |
|---|---|---|---|---|
| 1329 | −719 | 10100110001 | 917.0125MHz | 872.0125MHz |
| 2047 0 1 | −1 0 1 | 11111111111 00000000000 00000000001 | 934.9625MHz 934.9875MHz 935.0125MHz | 889.9625MHz 889.9875MHz 890.0125MHz |
| 600 | 600 | 01001011000 | 949.9875MHz | 904.9875MHz |

PORTABLE TELEPHONE SET TRANSMITTING AREA IDENTIFICATION SIGNAL INDICATIVE OF A RADIO ZONE OCCUPIED THEREBY

BACKGROUND OF THE INVENTION

This invention relates to a portable telephone set for use in a mobile communication system and, in particular, to a portable telephone set operated in the mobile communication system comprising a plurality of base stations each of which transmits an area identification signal indicative of an area identifier assigned to a radio zone in which the base station in question is disposed.

As one of such mobile communication systems is known a mobile cellular telephone system of the EIA/TIA (Electronic Industries Association/Telecommunications Industry Association) standard. The mobile cellular telephone system comprises a plurality of base stations and a plurality of portable telephone sets or mobile stations. The base stations are disposed in respective radio zones. Each base station is connected to an exchange station. Each of the portable telephone sets is located in one of the radio zones at a time.

The radio zones are assigned with area identifiers for identifying the radio zones. In the mobile cellular telephone system, each base station transmits on a downward control channel at a constant time interval, as binary data, an area identification signal indicative of the area identifier identifying the radio zone for the base station in question in accordance with a format defined by the EIA/TIA standard [EIA/TIA-553 issued by Electronic Industries Association]. Each portable telephone set receives a plurality of area identification signals transmitted on the downward control channel to determine, as a current area identification signal therefor, one of the area identification signals that has the strongest electric field thereamong. In addition, each portable telephone set determines whether or not the portable telephone set is located in or out a home system on the basis of the current area identification signal and carries out control of operation of location registration on the current area identification signal.

Assignment of the area identification signals are different in respective countries of the world from one another. For instance, different area identification signals are assigned to respective cities and respective operator companies in the United States of America while a plurality of area identification signals are assigned to each operator company in the United Kingdom. In addition, inasmuch as methods of the assignment are entrusted to the respective operator companies, different methods of assignment are used in the respective countries of the world from one another.

In the above-mentioned mobile cellular telephone system, each portable telephone set returns, in response to an incoming call signal or a paging signal, a page response signal for the portable telephone set to the base station on which the portable telephone set belongs. It is assumed that an answering signal is not sent to the base station because an off-hook operation is not carried out by a user for the portable telephone set. In this event, in general, the exchange station connected to the base station only sends, on a channel, a ring back tone indicative of during of incoming call to a caller. If the exchange station has an incoming transfer function, the exchange station calls a telephone terminal having another telephone number which is preliminarily registered therein when the answering signal is not sent from the portable telephone set within a predetermined time interval.

It is assumed that the portable telephone set has an automatic answering function. In this event, when the predetermined time interval elapses since the incoming call signal is received, the portable telephone set carries out an automatic answering operation to record a message of the caller if the automatic answering function is turned on or activated. In addition, there is another mobile cellular telephone system which comprises the exchange station having the automatic answering function.

It is presumed that a user of the portable telephone set cannot carry out response operation (answering operation) because the user is present in another place due to a meeting, a job or the like with the portable telephone set left although the user receiving the incoming call is within an area enabling telephone conversation. In this event, in prior art, the ring back tone is sent from the exchange station to the caller or the telephone terminal having the other telephone number is called by the incoming transfer function of the exchange station. Accordingly, the caller cannot confirm a location of the portable telephone set for an opposite party.

In addition, although the message of the caller is recorded by using the automatic answering function, the caller cannot confirm the location of the portable telephone set for the opposite party until the opposite party establishes connection with the caller.

In order to solve such a problem, various systems are already known. By way of example, a paging system is disclosed in Japanese Unexamined Patent Prepublication of Kôkai No. Hei 4-294,644 (294,644/1992) for Japanese Patent Application No. 83,446 of 1991. The paging system attains effective utilization of a receiver by displaying a map representing a current location of a possessor of the receiver and a location of an opposite party onto a display section. The paging system according to Kôkai No. Hei 4-294,644 comprises a plurality of subscriber telephone sets installed in fixed locations, a base station including a storage section for storing location information indicative of the fixed location of each of the subscriber telephone sets, and a paging receiver with display for displaying map information indicative of a map.

In the paging system, the base station is provided with the storage section for storing the location information indicative of the location of each of subscriber telephone sets. The paging receiver with display is formed to display the map information. A prescribed format signal is sent to the base station through the subscriber telephone sets. On receiving the format signal, the base station sends a signal including the location information indicative of the location of the subscriber telephone set. On reception of the signal including the location information, the paging receiver displays the map information indicative of the map representing the location of the subscriber telephone set. Moreover, on reception of the format signal, the base station calculates a route between the subscriber telephone sets and sends a signal including the location information indicative of the location and route information indicative of the route. On reception of the signal including the location information and the route information, the paging receiver displays map information indicative of another map representing the location of the subscriber telephone set and the route between the subscriber telephone sets.

However, the paging system according to Kôkai No. Hei 4-294,644 has a lot of hardware and much software because the base station must be provided with the storage section for storing the location information indicative of the location of each of the subscriber telephone sets.

Japanese Unexamined Patent Prepublication of Kôkai No. Hei 5-276,067 (276,067/1993) for Japanese Patent Application No. 68,688 of 1992 discloses a radio communication equipment which sends position information to a communication opposite party automatically by using a GPS reception section so as to receive a signal from a GPS satellite and to calculate position information data and sending the data together with voice information. The radio communication equipment according to Kôkai No. Hei 5-276,067 comprises a transmitter section and a receiver section. The transmitter section comprises the GPS reception section, a microphone, and a transmission section. The receiver section comprises a reception section, a position data voice separation section, a speaker, a position information decoding section, and a position information display section.

On receiving a signal from the GPS satellite, the GPS reception section calculates position information data. The transmission section sends the position information and a voice signal via a microphone to a communication opposite party continuously. On receiving a signal from the transmitter section by the reception section of the communication opposite party, the position data voice separation section separates the signal into the position information data and the voice signal. The position information data is displayed on the position information display section while the voice signal is reproduced by the speaker. Thus, the radio communication able to send the position information to the communication opposite party is automatically realized without oral contact.

However, the radio communication equipment according to Kôkai No. Hei 5-276,067 is expensive because the radio communication equipment comprises not only a transmission/reception section for intercommunication but also the GPS reception section for receiving the signal from the GPS satellite.

Japanese Unexamined Patent Prepublication of Kôkai No. Hei 5-328,432 (328,432/1993) for Japanese Patent Application No. 152,768 of 1992 discloses a cordless telephone system which easily confirms a location of a cordless telephone set of an opposite party when an extension call is implemented between cordless telephone sets. The cordless telephone system comprises a master set, a plurality of cordless telephone set connectors, and a plurality of cordless telephone sets. The cordless telephone set connectors form radio zones. The master set comprises a call processing section including an extension processing section, a memory section including a position registration information storage section, an external line interface section, a channel switch section, and a cordless telephone set connector interface section connected to the cordless telephone set connectors.

The cordless telephone sets use a cordless telephone set connector whose radio wave reception state is best among the cordless telephone set connectors. In the case of extension call among the cordless telephone sets, the extension processing section refers to the position registration information storage section in which the information of a radio zone relating to the cordless telephone set connector used by each of the cordless telephone sets to acquire the radio zone corresponding to the cordless telephone set connector by the caller and the called telephone sets and sends the acquired caller and called radio zones to the called and the caller cordless telephone sets as data to be displayed a display device of the called and the caller cordless telephone sets.

However, the cordless telephone system according to Kôkai No. Hei 5-328,432 has a lot of hardware and much software because the master set must be provided with the position registration information storage section for storing the information of the radio zones relating to the cordless telephone set connectors used by the cordless telephone sets.

SUMMARY OF THE INVENTION

It is therefore an object of this invention to provide a portable telephone set which is capable in a caller of easily confirming a location of a possessor of the portable telephone set although the possessor cannot carry out a response (answering) operation.

It is another object of this invention to provide a portable telephone set of the type described, which is simple in structure.

It is still another object of this invention to provide a portable telephone set of the type described, which is low in cost.

Other objects of this invention will become clear as the description proceeds.

On describing the gist of this invention, it is possible to understand that a portable telephone set is for use in a mobile communication system comprising a plurality of base stations disposed in respective radio zones. The base stations are assigned with area identifiers for identifying the respective radio zones. The base stations transmit area identification signals indicative of the area identifiers on a control channel. The portable telephone set is located in a first one of the radio zones for a first one of the base stations so that the portable telephone set enables to communicate with the first one of the base stations via the control channel and a plurality of voice channels.

According to an aspect of this invention, the above-understood portable telephone set comprises receiving means for receiving a first area identification signal transmitted from the first one of the base stations via the control channel. Connected to the receiving means, area identification holding means holds the first area identification signal as a current area identification signal. Responsive to an incoming call signal from the first one of the base stations, determining means determines whether or not the portable telephone set responds to the incoming call signal within a predetermined time interval elapsed since the incoming call signal is received. Connected to the determining means, ensuring means ensures one of the voice channels as an ensured voice channel by carrying out an automatic response for the incoming call signal when the portable telephone set does not respond to the incoming call signal within the predetermined time interval. Connected to the ensuring means and the area identification holding means, transmitting means transmits the current area identification signal on the ensured voice channel.

According to another aspect of this invention, the above-understood portable telephone set comprises receiving means for receiving a first area identification signal transmitted from the first one of the base stations via the control channel. Connected to the receiving means, area identification holding means holds the first area identification signal as a current area identification signal. Responsive to an incoming call signal from the first one of the base stations, ensuring means ensures one of the voice channels as an ensured voice channel by carrying out response for the incoming call signal. Connected to the ensuring means and the area identification holding means, transmitting means transmits the current area identification signal on the ensured voice channel.

Preferably, the transmitting means may include a DTMF transmission circuit for transmitting the current area identification signal as a DTMF signal. The receiving means may receive an area identification signal from an opposite party via one of the voice channels as a received area identification signal. In this event, the portable telephone set may further comprise displaying means, connected to the receiving means, for displaying the received area identification signal. The area identification signal may be a DTMF signal. In this event, the receiving means may include a DTMF reception circuit for receiving the DTMF signal. The portable telephone set may further comprise place name holding means, connected to the receiving means, for holding place name signals indicative of place name corresponding to the area identifiers, whereby the displaying means may display one of the place name signals that corresponds to the received area identification signal. The receiving means may receive a second area identification signal transmitted from a second one of the base stations via the control channel when the portable telephone set removes from the first one of the radio zones to a second one of the radio zones for the second one of the base stations. In this event, the portable telephone set may further comprise renewing means, connected to the receiving means and the area identification holding means, for renewing the current area identification signal in the area identification holding means by the second area identification signal.

DESCRIPTION OF THE PREFERRED EMBODIMENTS

Figure 1:
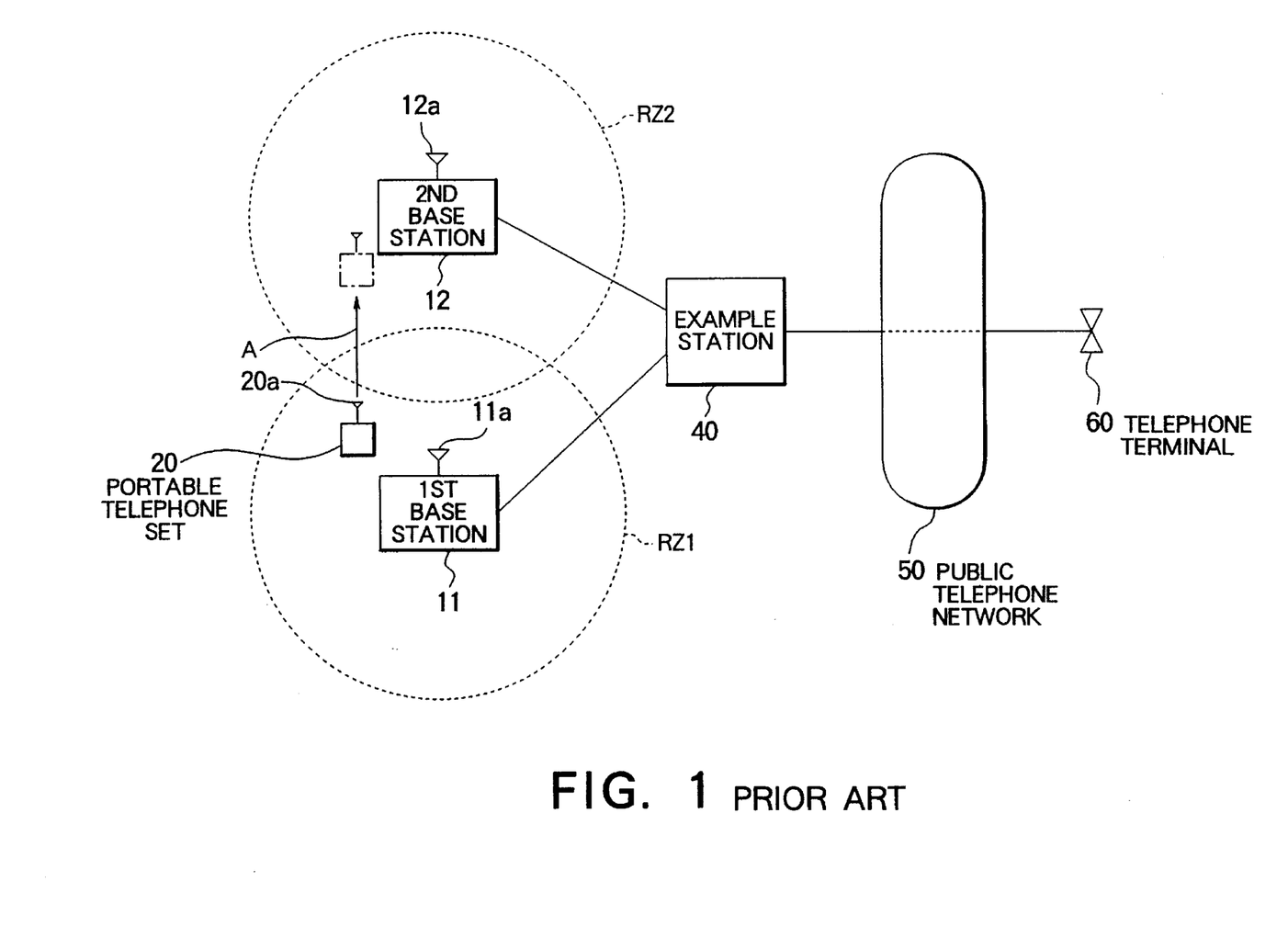
FIG. 1 is a block diagram of a mobile communication system to which a portable telephone set according to this invention is applicable.

Referring to FIG. 1, a mobile communication system comprises a plurality of base stations (only first and second base stations 11 and 12 are illustrated in FIG. 1), a plurality of portable telephone sets (only one portable telephone set 20 is illustrated in FIG. 1), an exchange station 40 connected to the first and the second base stations 11 and 12, a public telephone network 50 connected to the exchange station 40, and a plurality of telephone terminals (only one telephone terminal 60 is illustrated in FIG. 1) connected to the public telephone network 50. The portable telephone set 20 is called a mobile station while each of the first and the second base stations 11 and 12 is called a land station.

The first and the second base stations 11 and 12 are disposed in first and second radio zones RZ1 and RZ2, respectively. The first and the second radio zones RZ1 and RZ2 are assigned with first and second area identifiers for identifying the first and second radio zones RZ1 and RZ2, respectively. In the manner which will later become clear, the first and the second base stations 11 and 12 transmit first and second identification signals indicative of the first and the second area identifiers in the first and the second radio zones RZ1 and RZ2, respectively.

Each of the first and the second base stations 11 and 12 is a base station which is based on the above-mentioned mobile cellular telephone system of the EIA/TIA standard. In this event, the first and the second base stations 11 and 12 transmit, on a downward control channel at a constant time interval, as binary data, the first and the second area identification signal in accordance with a format defined by the EIA/TIA standard.

Figure 2A:
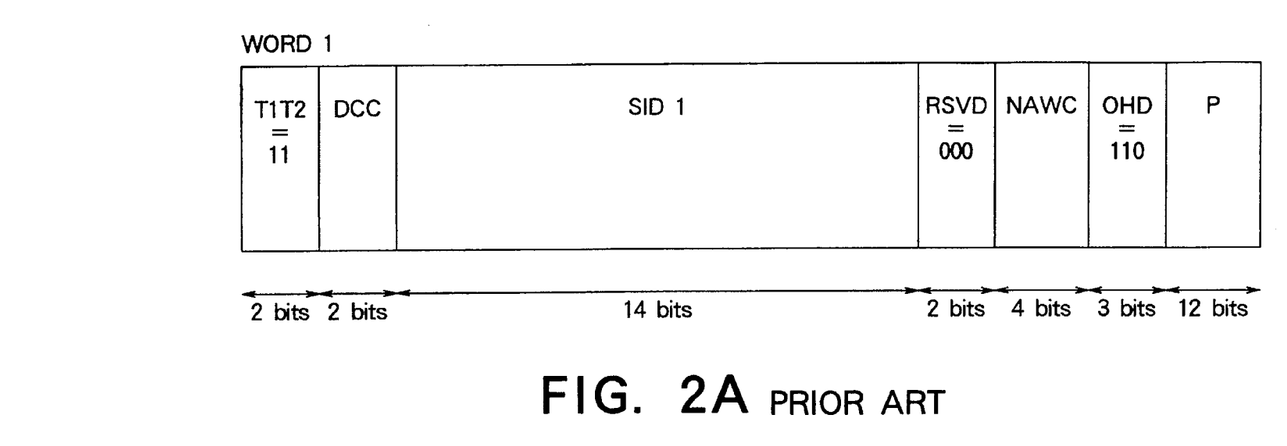
FIGS. 2A and 2B collectively show a format defined by EIA/TIA standard.
Figure 2B:
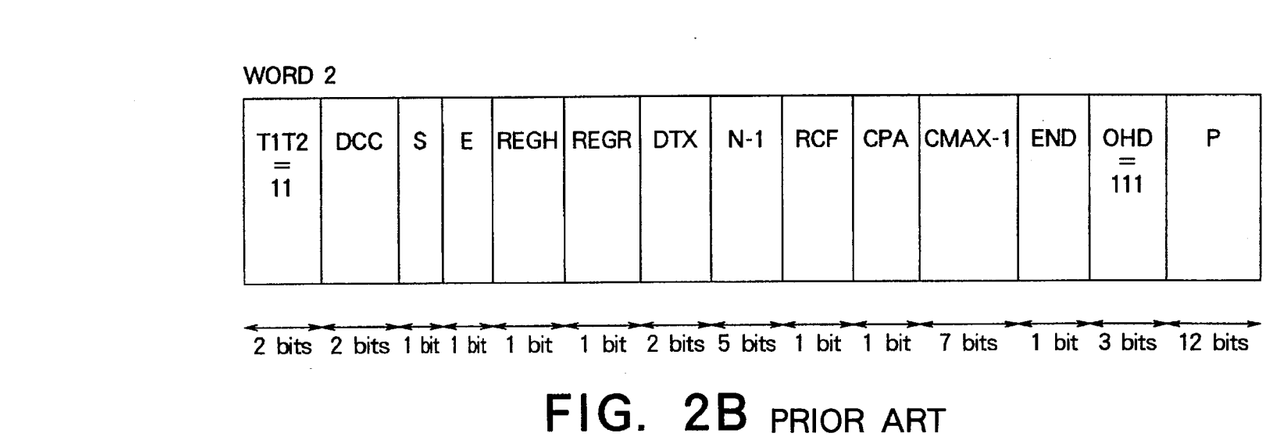

FIGS. 2A and 2B show the format defined by the EIA/TIA standard. The format defined by the EIA/TIA standard is a System Parameter Overhead Message (2 Word) format which consists of Word1 and Word2 as shown in FIGS. 2A and 2B, respectively.

As shown in FIG. 2A, the Word1 consists of a T1T2 field, a DCC field, a SID1 field, an RSVD field, an NAWC field, an OHD field, and a P field. The T1T2 field consists of 2 bits of "11" and indicates a type of Word. The DCC field consists of 2 bits and indicates a digital color code which is a digital signal transmitted by a land station on a forward control channel that is used to detect capture of a land station by an interfering mobile station. The SID1 field consists of 14 bits and indicates a system identification associated with each radio zone. The RSVD field is a reserved field consisting of 3 bits of "000". The NAWC field consists of 4 bits and indicates the number of the accompanying Word. The OHD field consists of 3 bits of "110" and indicates a type of a message. The P field is a parity field consisting of 12 bits.

As shown in FIG. 2B, the Word2 consists of a T1T2 field, a DCC field, an S field, an E field, an REGH field, an REGR field, a DTX field, an N-1 field, an RCF field, a CPF field, a CMAX-1 field, an END field, an OHD field, and a P field. The T1T2 field consists of 2 bits of "11" and indicates a type of Word. The DCC field consists of 2 bits and indicates a digital color code which is a digital signal transmitted by a land station on a forward control channel that is used to detect capture of a land station by an interfering mobile station. The S field consists of 1 bit and indicates an identifier whether the mobile station must send its serial number when accessing a system. The E field consists of 1 bit and indicates an identifier whether a home mobile station must send an upper portion of its station number when accessing a system. The REGH field consists of 1 bit and indicates designation of allowance/prohibition of location registration for the mobile station inside the radio zone. The REGR field consists of 1 bit and indicates designation of allowance/prohibition of location registration for the mobile station outside the radio zone. The DTX consists of 2 bits and indicates an identifier in what way the mobile station is permitted to use the discontinuous transmission mode on the voice channel. The N-1 field consists of 5 bits and indicates the number of paging channels that a mobile station must scan. The RCF field consists of 1 bit and indicates an identifier whether the mobile station must read a control-filler message before accessing a system on a reverse control channel. The CPA field consists of 1 bit and indicates an identifier whether the access functions are combined with the paging functions on the same set of control channels. The CMAX-field consists of 7 bits and indicates the maximum number of channels to be scanned by a mobile station when accessing a system. The END field consists of 1 bit. The OHD field consists of 3 bits of "111" and indicates a type of a message. The P field is a parity field consisting of 12 bits.

Figure 3:
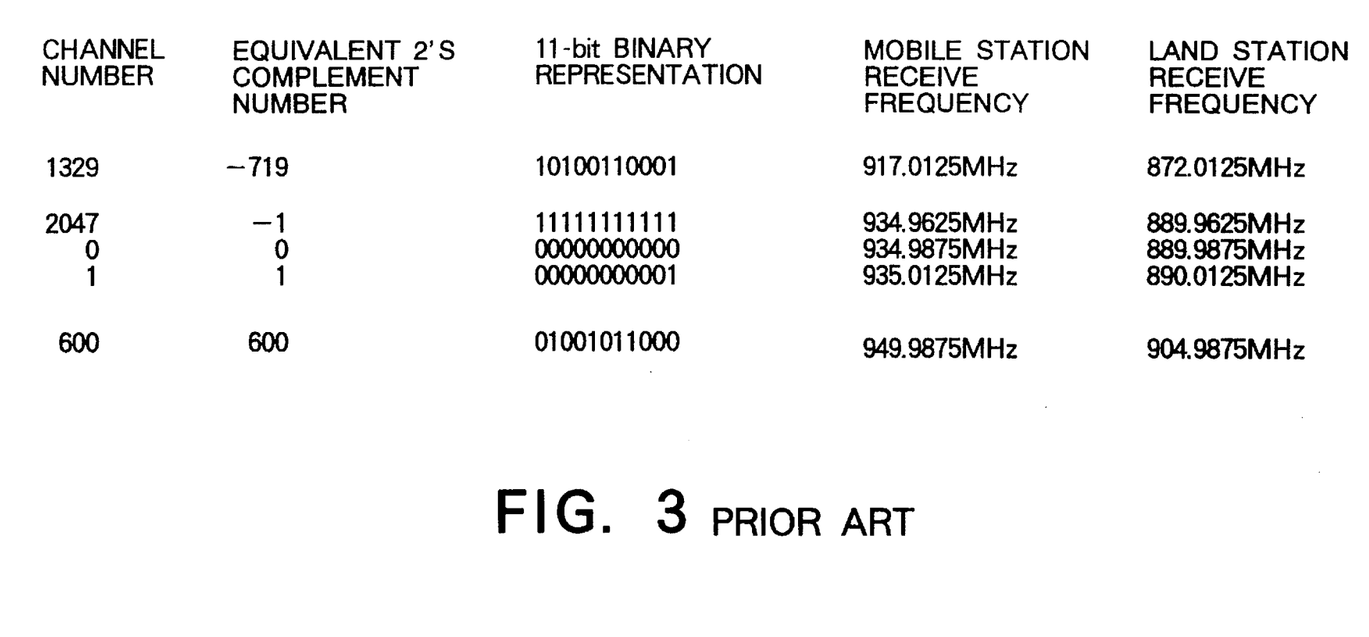
FIG. 3 shows channel number designation in TACS.

The portable telephone set 20 communicates with the first and the second base stations 11 and 12 via a plurality of radio channels which are classified into control channels for transmission/reception of signaling and speech or voice channels for speech or voice communication. For instance, TACS (Total Access Communication System) uses, as the control channels and the voice channels, either channels of channel numbers of 1329–2047 or channels of channel numbers of 0–600, as shown in FIG. 3. In practice, many mobile communication systems use channels of channel numbers of 23–43 and of 323–343 as the control channels and use other channels as the voice channels. The control channels are classified into three types, namely, a dedicated control channel (D-CH), a paging control channel (P-CH), and an access control channel (A-CH). The dedicated control channel is used to inform all of the mobile stations of an identification number of the exchange station, P-CH numbers, A-CH numbers, and so on. The paging control channel is used to call a specific mobile station. The access control channel is used to respond for outgoing call from the mobile station and incoming call to the mobile station or the like.

Figure 4A:
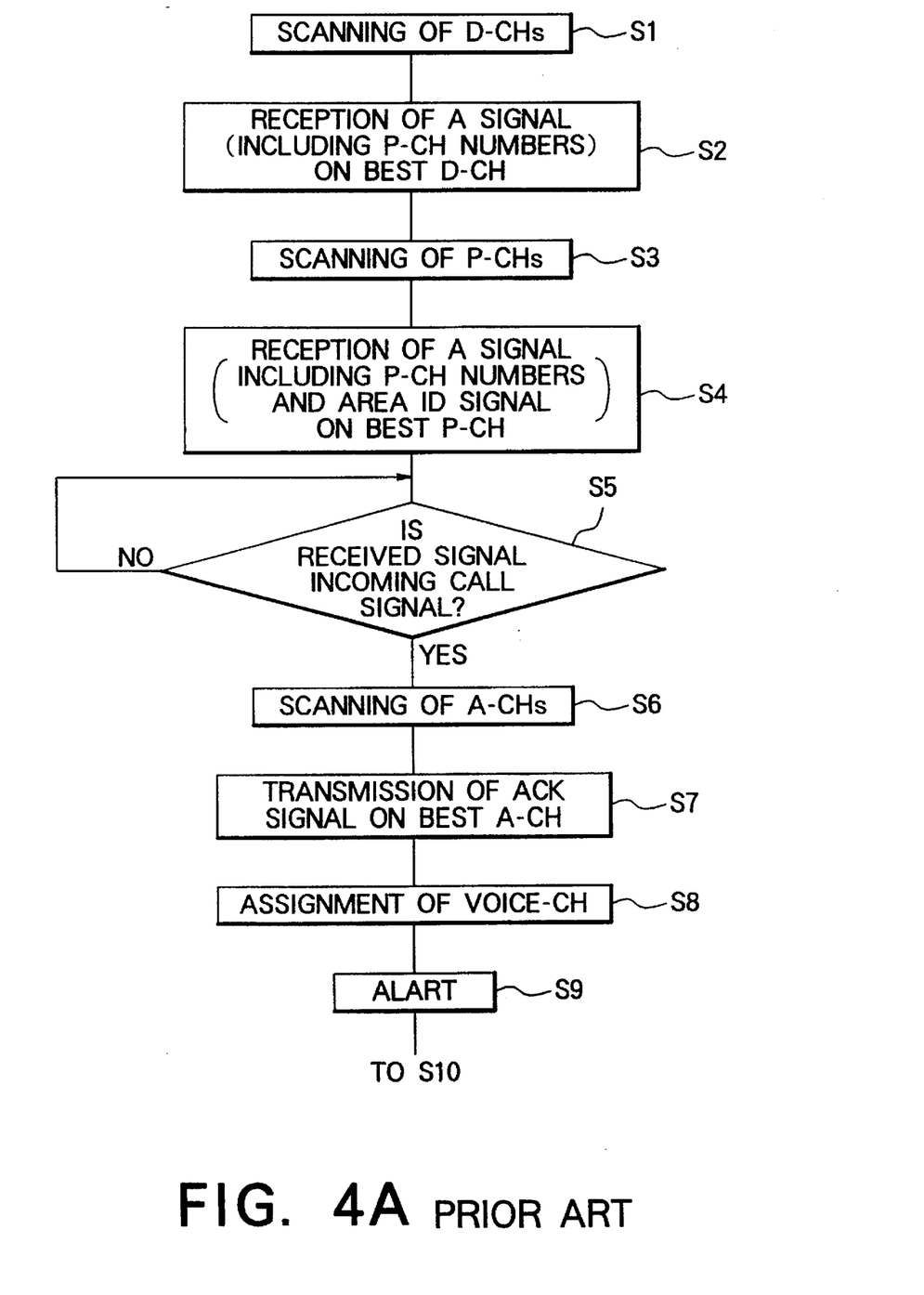
FIGS. 4A and 4B collectively show a flow chart for use in describing operation of a conventional portable telephone set.
Figure 4B:
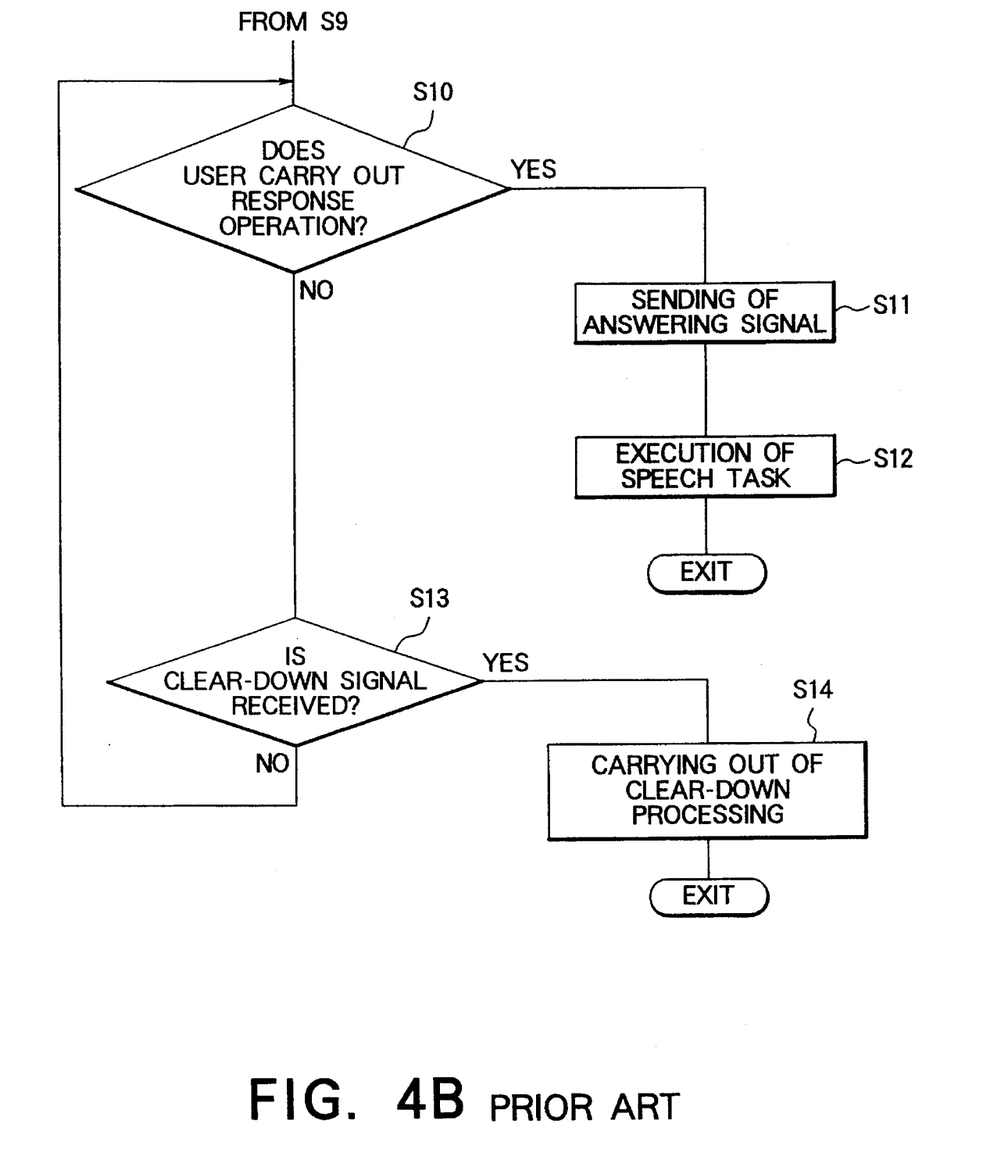

Turning to FIGS. 4A and 4B, operation of a conventional portable telephone set will be described in order to facilitate an understanding of the present invention. The portable telephone set scans the dedicated control channels at a step S1. The step S1 proceeds to a step S2 at which the portable telephone set receives a signal including the P-CH numbers on the dedicated control channel having the strongest electric field thereamong. The step S2 is followed by a step S3 at which the portable telephone set scans the paging control channels having the P-CH numbers. The step S3 is succeeded by a step S4 at which the portable telephone set receives a signal including the A-CH numbers and the area identification signal on the paging control channel having the strongest electric field thereamong. The step S4 proceeds to a step S5 at which the portable telephone set whether or not the received signal is an incoming call signal (a paging signal). When the received signal is the incoming call signal, the step S5 is followed by a step S6 at which the portable telephone set scans the access control channels having the A-CH numbers. The step S6 is succeeded by a step S7 at which the portable telephone set transmits an acknowledgment signal or a paging response signal on the access control channel having the strongest electric field thereamong.

The step S7 proceeds to a step S8 at which a voice channel is assigned to the portable telephone set. The step S8 is followed by a step S9 at which the portable telephone set alerts. The step S9 is succeeded by a step S10 at which the portable telephone set determines whether a user of the portable telephone set carries out a response operation or an answering operation. When the user carries out the response operation, the step S10 proceeds to a step S11 at which the portable telephone set sends an answering signal to the base station via the voice channel. The step S11 is followed by a step S12 at which the portable telephone set executes a speech task to set in a speech condition. When the user does not carry out the response operation, the step S10 is succeeded by a step S13 at which the portable telephone set determines whether or not it receives a clear-down signal. When the portable telephone set receives the clear-down signal, the step S13 proceeds to a step S14 at which the portable telephone set carries out a clear-down processing. Otherwise, the step S13 is turned back to the step S10.

Figure 5:
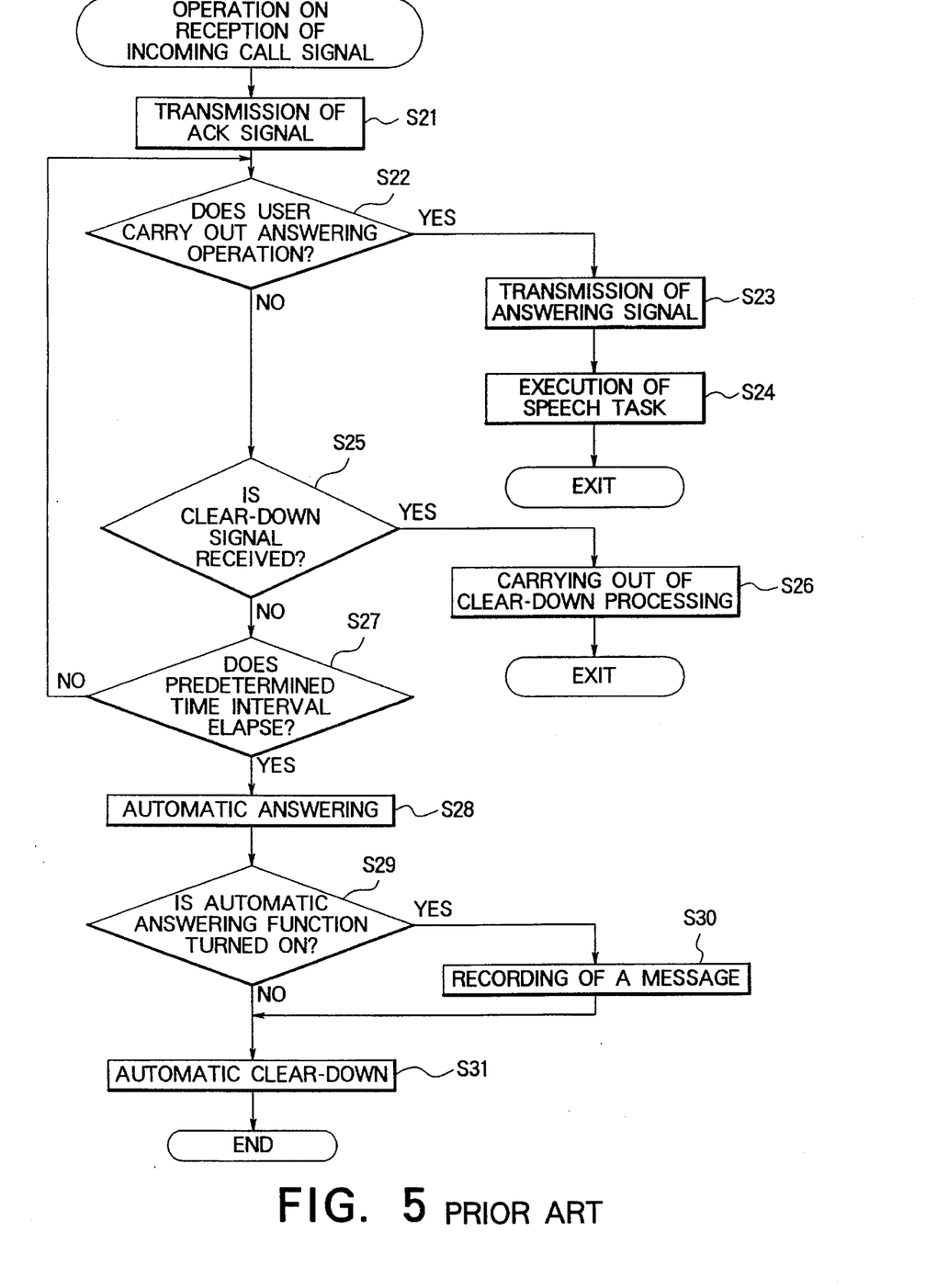
FIG. 5 is a flow chart for use in describing operation on reception of an incoming call signal in a conventional portable telephone set having an automatic answering function.

Turning to FIG. 5, description will proceed to operation on reception of an incoming call signal in a conventional portable telephone set having an automatic answering function. When the portable telephone set receives an incoming call signal (a paging signal), the portable telephone set transmits an acknowledgment signal or a paging response signal on an upward control channel at a step S21. Thereafter, the portable telephone set is assigned with a voice channel and alerts. The step S21 is succeeded by a step S22 at which the portable telephone set determines whether a user of the portable telephone set carries out a response operation. When the user carries out the response operation, the step S22 proceeds to a step S23 at which the portable telephone set sends an answering signal to the base station via the voice channel. The step S23 is followed by a step S24 at which the portable telephone set executes a speech task to set in a speech condition. In this event, the voice channel is ensured to enable two-way communication between the portable telephone set and the base station.

When the user does not carry out the response operation, the step S22 Is succeeded by a step S25 at which the portable telephone set determines whether or not it receives a clear-down signal. When the portable telephone set receives the clear-down signal, the step S25 proceeds to a step S26 at which the portable telephone set carries out a clear-down processing. When the portable telephone set does not receive the clear-down signal, the step S25 is followed by a step S27 at which the portable telephone set determines whether or not a predetermined time interval elapses since the incoming call signal is received. When the predetermined time interval does not elapse, the step S27 is turned back to the step S22. When the predetermined time interval elapses, the step S27 is succeeded by a step S28, the portable telephone set carries out an automatic answering operation. That is, the portable telephone set automatically sends the answering signal to the base station via the voice channel. In this event, the voice channel is ensured. The step S28 proceeds to a step S29 at which the portable telephone set determines whether the automatic answering function is turned on or off. When the automatic answering function is turned on, the step S29 is followed by a step S30 at which the portable telephone set records a message of the caller or an opposite party. When the automatic answering function is turned off or when the recording of the message comes to an end, the portable telephone set carries out automatic clear-down to send a clear-down signal to the base station at a step S31.

With this structure, the mobile communication system provided with the conventional portable telephone set is disadvantageous in that the caller cannot confirm a location of the portable telephone set for an opposite party, as mentioned in the preamble of the instant specification.

Figure 6:
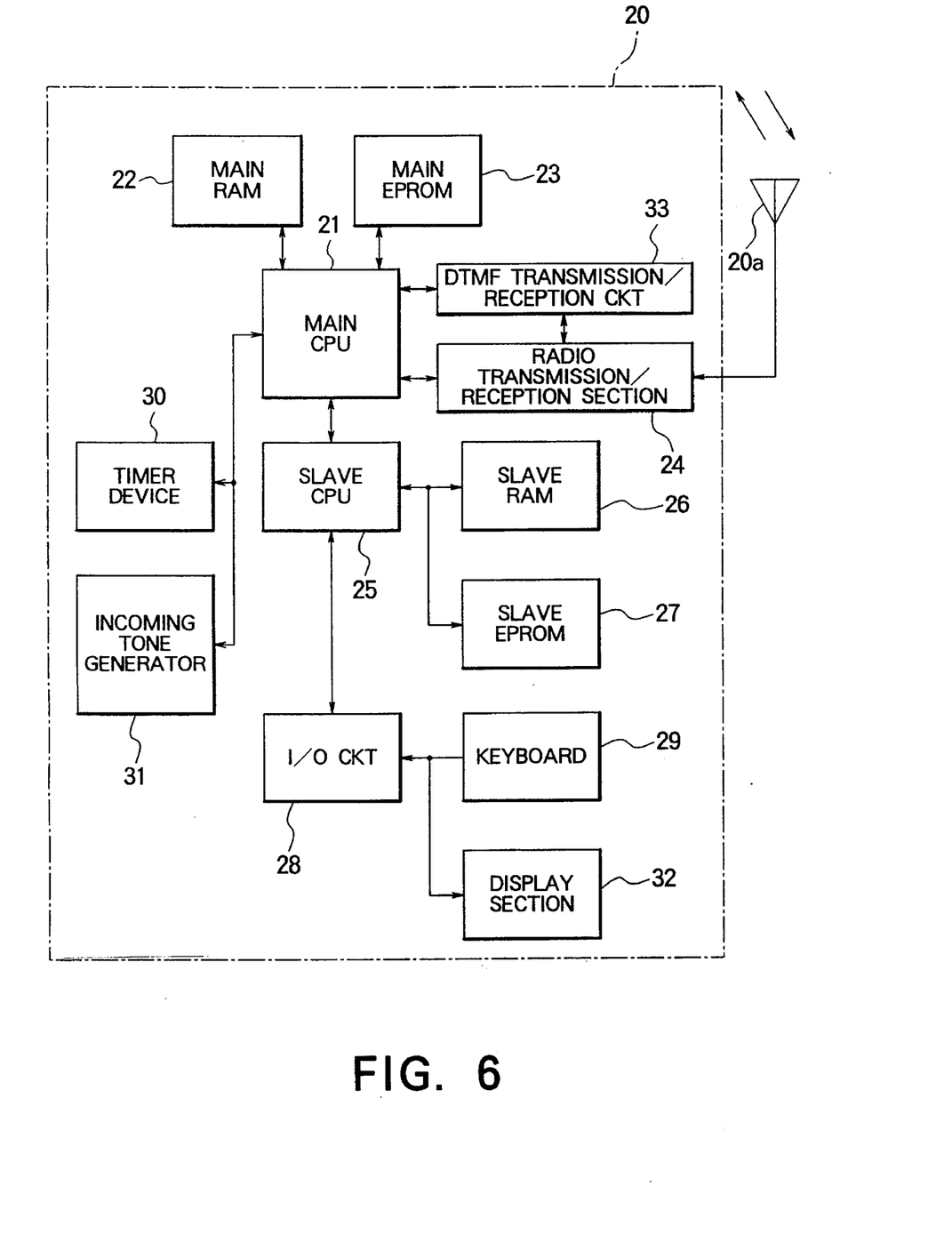
FIG. 6 is a block diagram of the portable telephone set illustrated in FIG. 1.

Referring to FIG. 6 in addition to FIG. 1, the portable telephone set 20 has a telephone antenna 20a while the first and the second base stations 11 and 12 have first and second base antennas 11a and 12a, respectively. The portable telephone set 20 is in radio communication with the first and the second base stations 11 and 12 via the telephone antenna 20a and the first and the second base antennas 11a and 12a.

The portable telephone set 20 comprises a main central processing unit (CPU) 21, a main random access memory (RAM) 22 connected to the main CPU 21, a main erasable programmable read-only memory (EPROM) 23 connected to the main CPU 21, a radio transmission/reception section 24 connected to the main CPU 21 and the telephone antenna 20a, a slave CPU 25 connected to the main CPU 21, a slave RAM 26 connected to the slave CPU 25, a slave EPROM 27 connected to the slave CPU 25, an input/output (I/O) circuit 28 connected to the slave CPU 25, a keyboard 29 connected to the I/O circuit 28, a timer device 30 connected to the main CPU 21, an incoming tone generator 31 connected to the main CPU 21, and a display section 32 connected to the I/O circuit 28.

The main CPU 21 operates on the basis of a main program stored in the main EPROM 23 and uses the main RAM 22 at any time as main memory locations for main variables required on a main operation. The slave CPU operates on the basis of a slave program stored in the slave EPROM 27 and uses the slave RAM 26 at any time as slave memory locations for slave variables required on a slave operation. In addition, the slave CPU 25 carries out a reception processing for code converted key data through the I/O circuit 28 due to push of the keyboard 29, a notice processing for the main CPU 21, and an output processing for the display section 32 through the I/O circuit 28. The portable telephone set 20 further comprises a DTMF transmission/reception circuit 33 connected to the main CPU 21 and the radio transmission/reception section 24.

Figure 7:
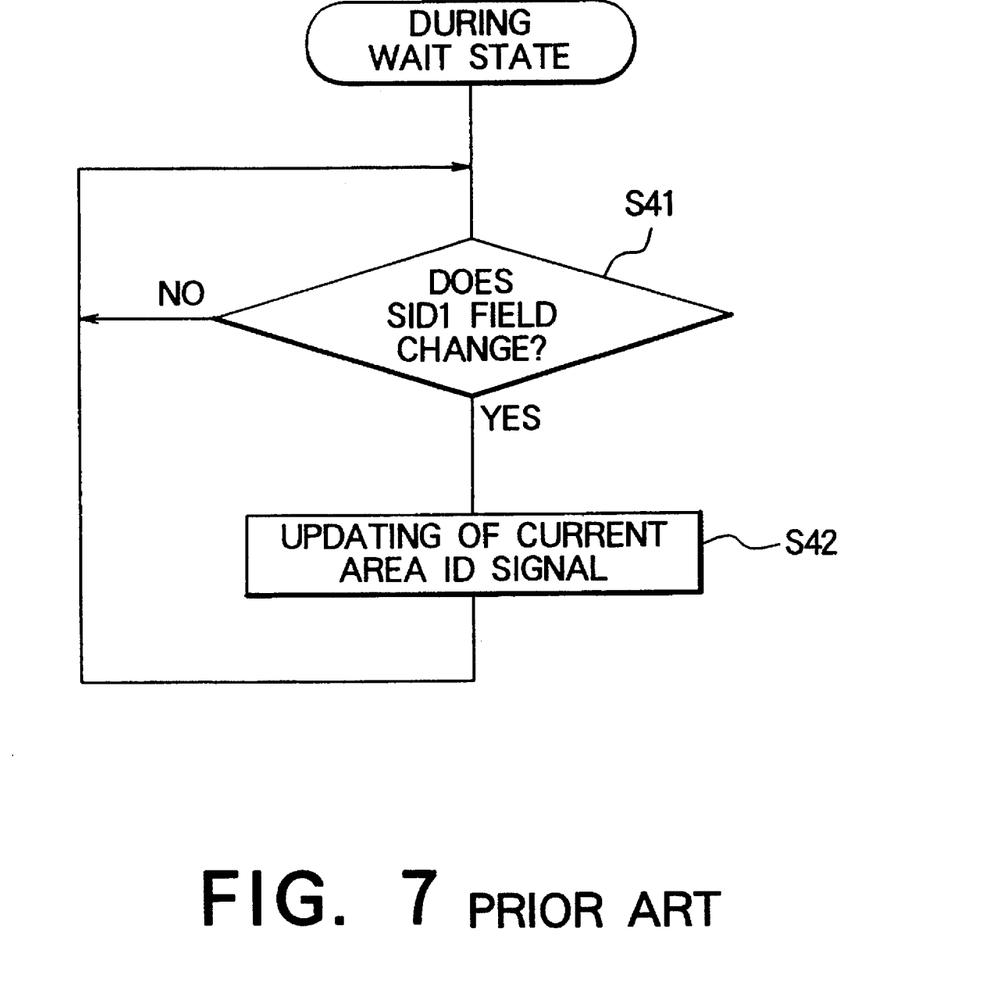
FIG. 7 shows a flow chart for use in describing operation in a case where the portable telephone set removes from a first radio zone to a second radio zone.

Turning to FIG. 7 in addition to FIGS. 1 and 6, it is assumed that the portable telephone set 20 is located in the first radio zone RZ1 as shown in a solid line of FIG. 1. The main CPU 21 monitors reception data on the control channel through the telephone antenna 20a and the radio transmission/reception section 24. When the main CPU 21 receives, as the reception data, data having the format illustrated in FIGS. 2A and 2B, the main CPU 21 extracts the SID1 field from the reception data and writes the extracted SID1 field in the main RAM 22 as a current area identification signal. Inasmuch as the portable telephone set 20 is located in the first radio zone RZ1, the portable telephone set 20 receives, as the SID1 field, the first area identification signal from the first base station 11. As a result, the main CPU 21 writes, as the current area identification signal, the first area identification signal in the main RAM 22. That is, the main RAM 22 stores the first area identification signal as the current area identification signal.

It is presumed that the portable telephone set 20 removes from the first radio zone RZ1 to the second radio zone RZ2 along the direction of an arrow A in FIG. 1. Under the circumstances, the portable telephone set 20 receives, as the SID1 field, the second area identification signal from the second base station 12. During a wait state, the main CPU 21 determines whether or not the SID1 field changes at a step S41. Inasmuch as the portable telephone set 20 removes from the first radio zone RZ1 to the second radio zone RZ2, the SID1 field changes from the first area identification signal to the second area identification signal. Accordingly, the main CPU 21 writes, as the current area identification signal, the second area identification signal in the main RAM 22 at a step S42. That is, the main RAM 22 stores the second area identification signal as the current area identification signal thereby the current area identification signal is renewed or updated.

Figure 8:
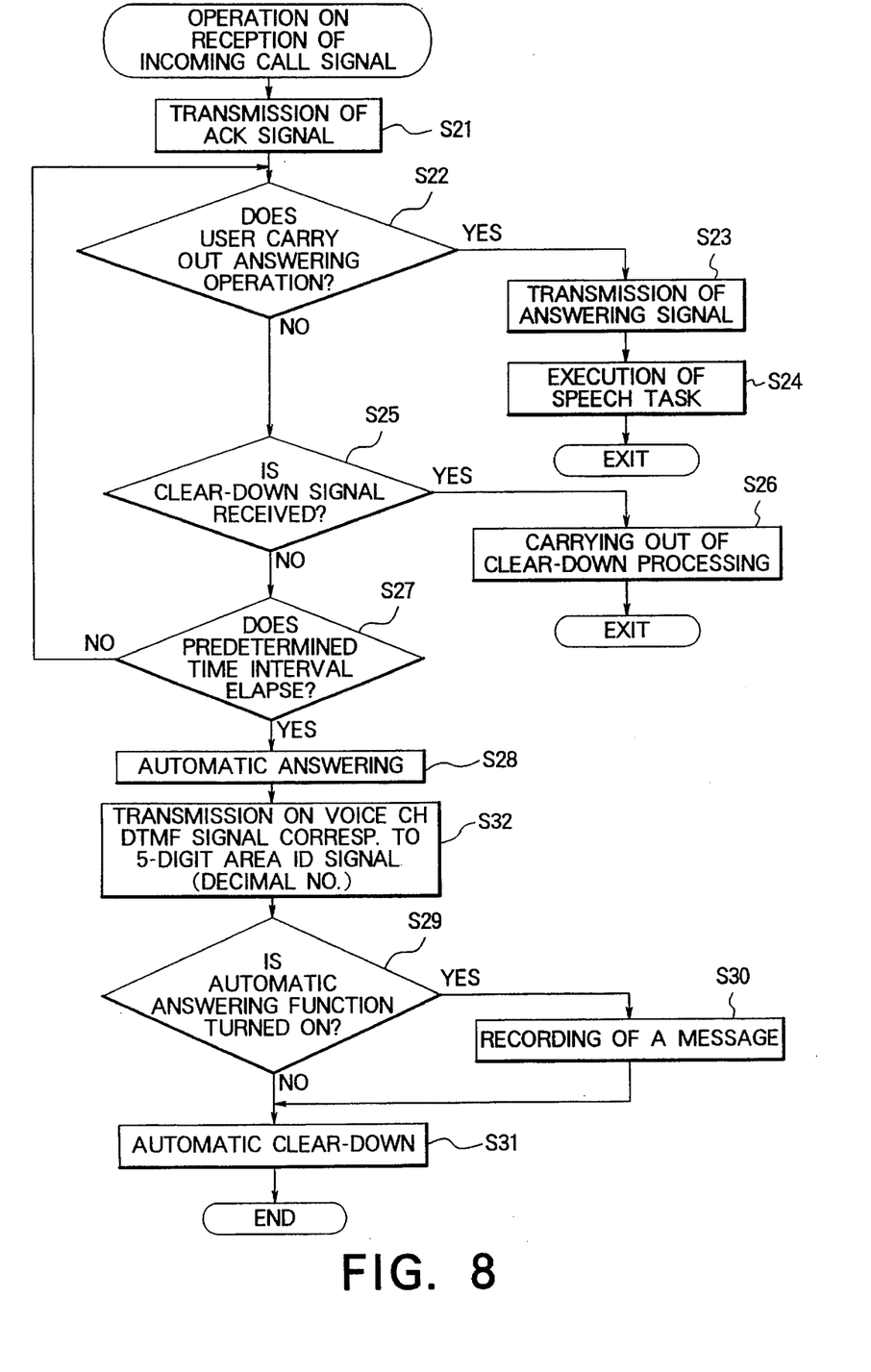
FIG. 8 is a flow chart for use in describing operation on reception of an incoming call signal in a portable telephone set according to this invention.

Referring to FIG. 8 in addition to FIG. 6, description will proceed to an operation on reception of an incoming call signal in the portable telephone set 20 having an automatic answering function. The illustrated operation in the portable telephone set 20 is similar to that illustrated in FIG. 5 except that a step S32 is inserted between the steps S28 and S29. It is assumed that the portable telephone set 20 is located in the first radio zone RZ1 (FIG. 1) and the telephone terminal 60 calls the portable telephone set 20.

The main CPU 21 monitors reception of the incoming call signal corresponding to a telephone number assigned to the portable telephone set 20. When the main CPU 21 detects the incoming call signal addressed to the portable telephone set 20, the main CPU 21 transmits an acknowledgment signal or a paging response signal on an upward control channel through the radio transmission/reception section 24 at the step S21. In this event, the main CPU 21 is assigned with one of voice channels as an assigned voice channel and activates the timer device 30 and the incoming tone generator 31 to alert. The step S21 is succeeded by the step S22 at which the main CPU 21 monitors the key data from the slave CPU 25 to determine whether a user of the portable telephone set 20 carries out a response operation for an incoming tone generated by the incoming tone generator 31. When a response key of the keyboard 29 is pushed during generation of the incoming tone by the incoming tone generator 31, the slave CPU 25 sends the key data corresponding to the response key to the main CPU 21. When the main CPU 21 receives the key data corresponding to the response key from the slave CPU 25, the step S22 proceeds to the step S23 at which the main CPU 21 transmits an answering signal to the first base station 11 via the assigned voice channel. The step S23 is followed by the step S24 at which the main CPU 21 executes the speech task to set in the speech condition. In this event, the assigned voice channel is ensured as an ensured voice channel.

When the user does not carry out the response operation, the step S22 is succeeded by the step S25 at which the main CPU 21 determines whether or not it receives a clear-down signal. When the main CPU 21 receives the clear-down signal, the step S25 proceeds to the step S26 at which the main CPU 21 carries out the clear-down processing. When the main CPU 21 does not receive the clear-down signal, the step S25 is followed by the step S27 at which the main CPU 21 determines whether or not the predetermined time interval elapses on the basis of a timer value in the timer device 30 since the incoming call signal is received. When the predetermined time interval does not elapse, the step S27 is turned back to the step S22.

It is assumed that the portable telephone set 20 preliminarily makes an absent transfer contract with the exchange station 40 (FIG. 1). In this event, when there is no response within five periods of the incoming tone, the exchange station 40 sends a signal indicative of cancellation of a current incoming mode to the portable telephone set 20 and carries out call to a telephone terminal (not shown) having a different telephone number which is preliminarily registered in the exchange station 40.

When the main CPU 21 does not receive the key data corresponding to the response key from the slave CPU 25 within the predetermined time interval measured by the timer device 30, the step S27 is succeeded by the step S28, the main CPU 21 carries out the automatic answering operation. That is, the main CPU 21 automatically sends the answering signal to the first base station 11 via the assigned voice channel. In this event, the assigned voice channel is ensured as an ensured voice channel. The step S28 is followed by the step S32 at which the main CPU 21 activates the DTMF transmission/reception circuit 33 to make the DTMF transmission/reception circuit 33 transmit, on the ensured voice channel, a dualtone multi-frequency (DTMF) signal corresponding to 5-digit decimal number indicative of the current area identification signal stored in the main RAM 22. The step S32 proceeds to the step S29 at which the main CPU 21 determines whether the automatic answering function of the portable telephone set 20 is turned on or off. When the automatic answering function is turned on, the step S29 is followed by the step S30 at which the main CPU 21 records a message of the caller or an opposite party. When the automatic answering function is turned off or when the recording of the message comes to an end, the main CPU 21 carries out the automatic clear-down to send the clear-down signal to the first base station 11 through the radio transmission/reception section 24 at the step S31. Thereafter the main CPU 21 monitors the reception data on the control channel again.

Figure 9:
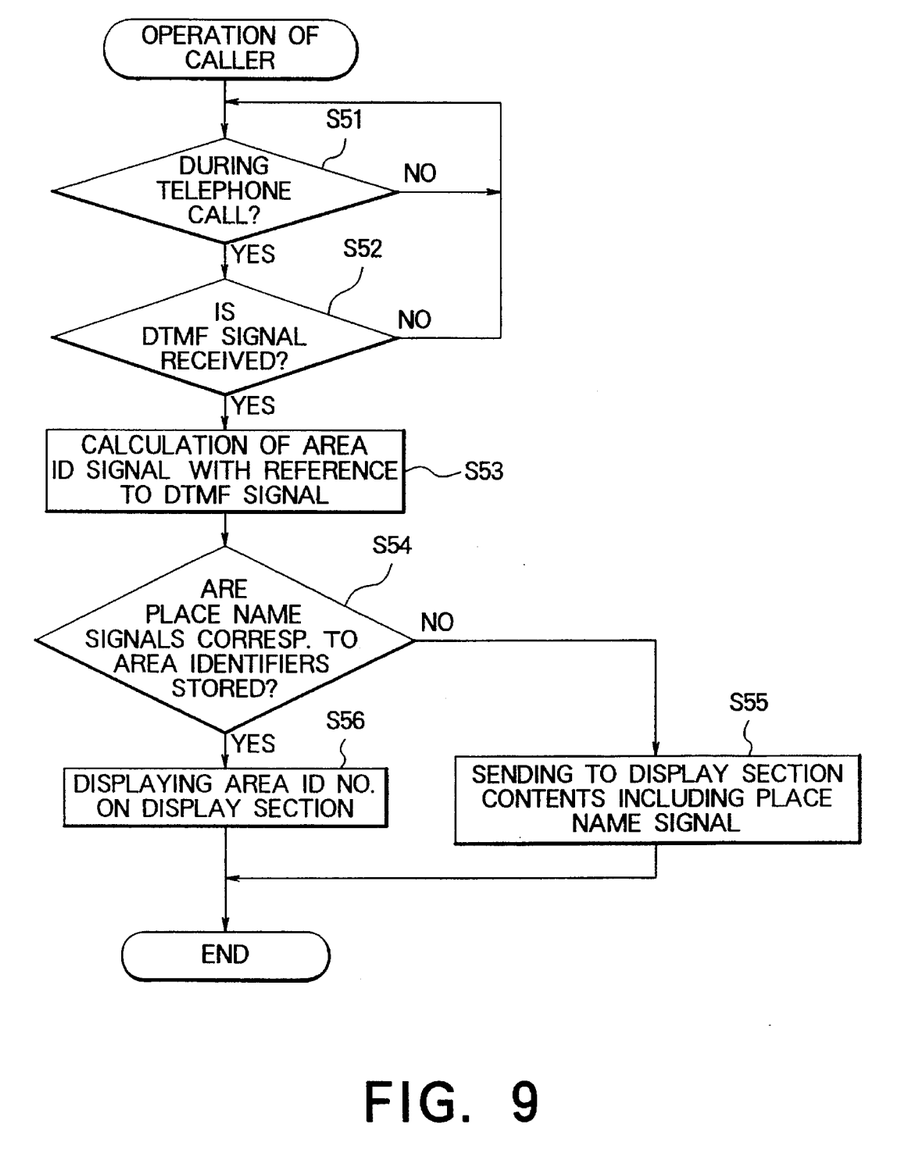
FIG. 9 is a flow chart for use in describing operation of a telephone terminal for a caller.

Turning to FIG. 9, description will proceed to operation of the telephone terminal 60 for the caller. The telephone terminal 60 is similar in structure to the portable telephone set 20 except that the telephone terminal 60 comprises a transmission/reception section (not shown) in lieu of the telephone antenna 20a and the radio transmission/reception section 24. Therefore, the telephone terminal 60 comprises similar components which are denoted by the same reference numerals as shown in FIG. 6. The telephone terminal 60 may be a portable telephone set. The illustrated telephone terminal 60 has a DTMF tone reception function.

The main CPU 21 of the telephone terminal 60 determines whether or not it is during a telephone call at step S51. When the telephone terminal 60 is during the telephone call, the step S51 proceeds to a step S52 at which the main CPU 21 of the telephone terminal 60 determines whether or not the DTMF transmission/reception circuit 33 of the telephone terminal 60 receives the DTMF signal. When the DTMF transmission/reception circuit 33 of the telephone terminal 60 does not receive the DTMF signal, the step S52 is turned back to the step S51.

When the DTMF signal is transmitted, on the ensured voice channel, from the portable telephone set 20 to the telephone terminal 60 through the first base station 11, the exchange station 40, and the public telephone network 50, the step S52 is followed by a step S53 at which the main CPU 21 of the telephone terminal 60 calculates a received area identification signal (the 5-digit decimal number) with reference to the DTMF signal. The step S53 is succeeded by a step S54 at which the main CPU 21 of the telephone terminal 60 determines whether or not the main EPROM 23 thereof stores place name signals indicative of place names corresponding to the area identifiers. The place name signals may be stored in the main RAM 22.

When the main EPROM 23 of the telephone terminal 60 stores the place name signals, the step S54 proceeds to a step S55 at which the main CPU 21 of the telephone terminal 60 sends and displays, to and on the display section 32 through the slave CPU 25 and the I/O circuit 28, contents including one of the place name signals, for example, "Answering unable from Dallas". In the contents displayed on the display section 32, the one of the place name signals that corresponds to the received area identification signal is displayed on an underlined part. In addition, the contents displayed on the display section 32 may be announced to the caller in a voice if the telephone terminal 60 comprises a memory for storing voice information.

When the main EPROM 23 of the telephone terminal 60 does not store the place name signals, the step S54 is followed by a step S56 at which the main CPU 21 of the telephone terminal 60 displays the received area identification signal on the display section 32 as it is.

With this structure, it is possible for the caller to immediately confirm a location of an opposite party (the user of the portable telephone set 20). As a result, it is possible to prevent the user from feeling uneasy caused by no confirmation of the location of the opposite party. Inasmuch as it is unnecessary to control the base station on transmission of location information (the area identification signal), it is possible to realize an informing function of the location information in simple structure and at a low cost.

Figure 10:
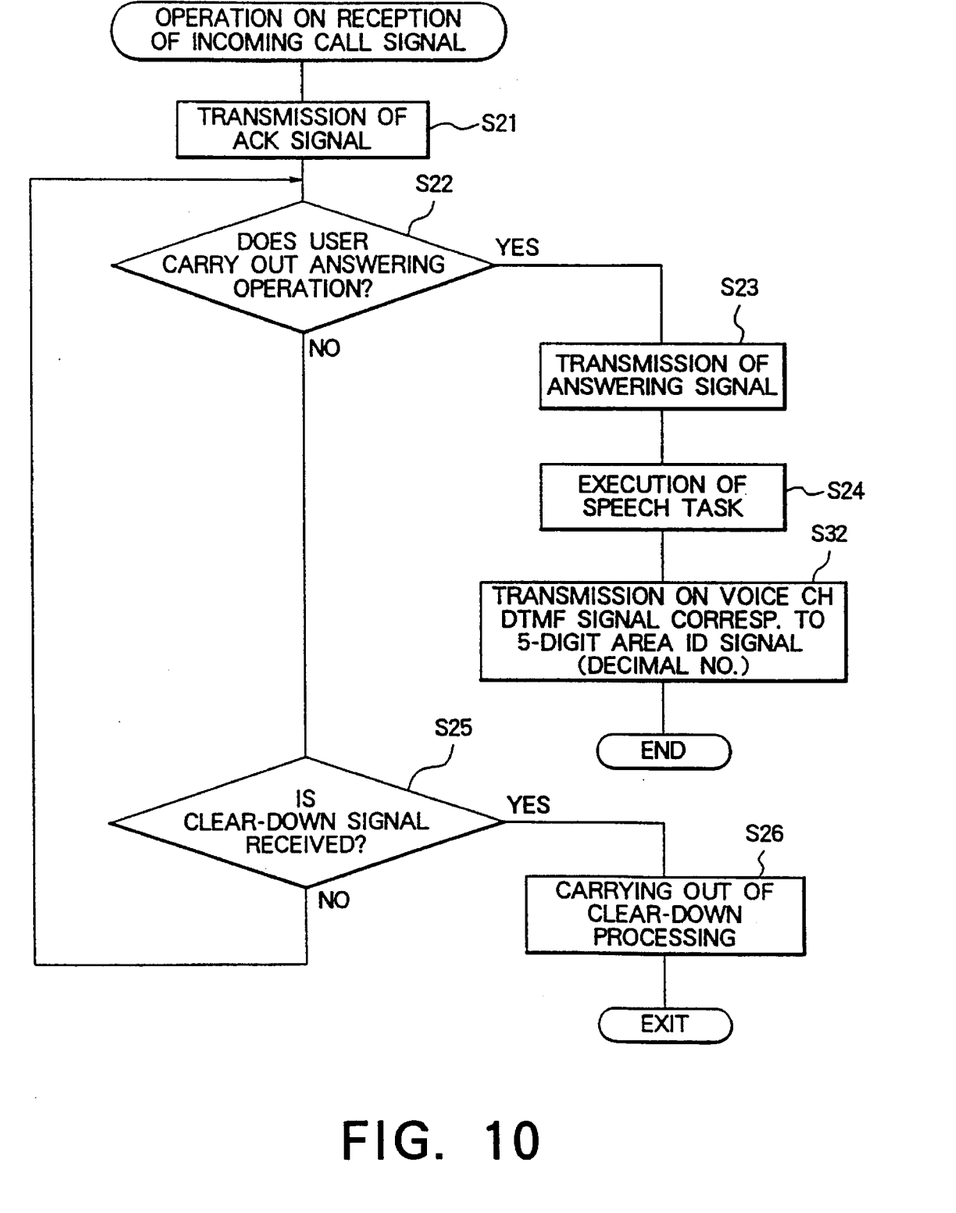
FIG. 10 is a flow chart for use in describing another operation on reception of an incoming call signal in a portable telephone set according to this invention.

Referring to FIG. 10 in addition to FIG. 6, description will proceed to another operation on reception of the incoming call signal in the portable telephone set 20. The illustrated operation in the portable telephone set 20 is similar to that illustrated in FIG. 5 except that the steps S27 to S31 are deleted from FIG. 5 and the step S32 follows the step S24. It is assumed that the portable telephone set 20 is located in the first radio zone RZ1 (FIG. 1) and the telephone terminal 10 calls the portable telephone set 20.

The main CPU 21 monitors reception data of the incoming call signal corresponding to the telephone number assigned to the portable telephone set 20. When the main CPU 21 detects the incoming call signal addressed to the portable telephone set 20, the main CPU 21 transmits the acknowledgment signal or the paging response signal on the upward control channel through the radio transmission/reception section 24 at the step S21. In this event, the main CPU 21 assigns one of voice channels as an assigned voice channel and activates the timer device 30 and the incoming tone generator 31 to alert. The step S21 is succeeded by the step S22 at which the main CPU 21 monitors the key data from the slave CPU 25 to determine whether the user of the portable telephone set 20 carries out the response operation for the incoming tone generated by the incoming tone generator 31. When the response key of the keyboard 29 is pushed during generation of the incoming tone by the incoming tone generator 31, the slave CPU 25 sends the key data corresponding to the response key to the main CPU 21. When the main CPU 21 receives the key data corresponding to the response key from the slave CPU 25, the step S22 proceeds to the step S23 at which the main CPU 25 transmits the answering signal to the first base station 11 (FIG. 1) via the assigned voice channel. The step 23 is followed by the step S24 at which the main CPU 21 executes the speech task to set in the speech condition. In this event, the main CPU 21 ensures the assigned voice channel as an ensured voice channel. The steps S24 proceeds to the step S32 at which the main CPU 21 transmits, on the ensured voice channel, the DTMF signal corresponding to the 5-digit decimal number indicative of the current area identification signal stored into the main RAM 22.

When the user does not carry out the response operation, the step S22 is succeeded by the step S25 at which the main CPU 21 determines whether or not it receives the clear-down signal. When the main CPU 21 receives the clear-down signal, the step S25 proceeds to the step S26 at which the main CPU 21 carries out the clear-down processing. When the main CPU 21 does not receive the clear-down signal, the step S25 is turned back to the step S22.

While this invention has thus far been described in conjunction with a few embodiments thereof, it will readily be possible for those skilled in the art to put this invention into practice in various other manners. For example, the main RAM 22 for holding the current area identification signal may be backed up by a back-up battery (not shown) in order that the contents contained in the main RAM 22 does not disappear.

What is claimed is:

1. A portable telephone set for use in a mobile communication system comprising a plurality of base stations disposed in respective radio zones, the base stations being assigned with area identifiers for identifying the respective radio zones, the base stations transmitting area identification signals indicative of the area identifiers on a control channel, said portable telephone set being located in a first one of said radio zones for a first one of the base stations so that said portable telephone set enables to communicate with said first one of the base stations via the control channel and a plurality of voice channels, said portable telephone set comprising:

receiving means for receiving a first area identification signal transmitted from said first one of the base stations via the control channel;

area identification holding means, connected to said receiving means, for holding the first area identification signal as a current area identification signal;

determining means, responsive to an incoming call signal from said first one of the base stations, for determining whether or not a user of said portable telephone set answers to the incoming call signal within a predetermined time interval elapsed since the incoming call signal is received;

ensuring means, connected to said determining means, for ensuring one of the voice channels as an ensured voice channel by carrying out an automatic answering for the incoming call signal when said user does not answer to the incoming call signal within the predetermined time interval; and transmitting means, connected to said ensuring means and said area identification holding means, for transmitting the current area identification signal on the ensured voice channel.

2. A portable telephone set as claimed in claim 1, wherein said transmitting means includes a DTMF transmission circuit for transmitting the current area identification signal as a DTMF signal.

3. A portable telephone set as claimed in claim 1, said receiving means receiving an area identification signal from an opposite party via one of the voice channels as a received area identification signal, wherein said portable telephone set further comprises displaying means, connected to said receiving means, for displaying the received area identification signal.

4. A portable telephone set as claimed in claim 3, the area identification signal being a DTMF signal, wherein said receiving means includes a DTMF reception circuit for receiving the DTMF signal.

5. A portable telephone set as claimed in claim 3, wherein said portable telephone set further comprises place name holding means, connected to said receiving means, for holding place name signals indicative of place name corresponding to the area identifiers, whereby said displaying means displays one of the place name signals that corresponds to the received area identification signal.

6. A portable telephone set as claimed in claim 1, said receiving means receiving a second area identification signal transmitted from a second one of said base stations via the control channel when said portable telephone set removes from said first one of the radio zones to a second one of said radio zones for said second one of the base stations, wherein said portable telephone set further comprises renewing means, connected to said receiving means and said area identification holding means, for renewing the current area identification signal in said area identification holding means by the second area identification signal.

7. A portable telephone set for use in a mobile communication system comprising a plurality of base stations disposed in respective radio zones, the base stations being assigned with area identifiers for identifying the respective radio zones, the base stations transmitting area identification signals indicative of the area identifiers via a control channel, said portable telephone set being located in a first one of said radio zones for a first one of the base stations so that said portable telephone set enables to communicate with said first one of the base stations via the control channel and a plurality of voice channels, said portable telephone set comprising:

receiving means for receiving a first area identification signal transmitted from said first one of the base stations via the control channel;

area identification holding means, connected to said receiving means, for holding the first area identification signal as a current area identification signal;

ensuring means, responsive to an incoming call signal from said first one of the base stations, for ensuring one of the voice channels as an ensured voice channel by carrying out an answering for the incoming call signal; and transmitting means, connected to said ensuring means and said area identification holding means, for transmitting the current area identification signal on the ensured voice channel.

8. A portable telephone set as claimed in claim 7, wherein said transmitting means includes a DTMF transmission circuit for transmitting the current area identification signal as a DTMF signal.

9. A portable telephone set as claimed in claim 7, said receiving means receiving an area identification signal from an opposite party via one of the voice channels as a received area identification signal, wherein said portable telephone set further comprises displaying means, connected to said receiving means, for displaying the received area identification signal.

10. A portable telephone set as claimed in claim 9, the area identification signal being a DTMF signal, wherein said receiving means includes a DTMF reception circuit for receiving the DTMF signal.

11. A portable telephone set as claimed in claim 9, wherein said portable telephone set further comprises place name holding means, connected to said receiving means, for holding place name signals indicative of place names corresponding to the area identifiers, whereby said displaying means displays one of the place name signals that corresponds to the received area identification signal.

12. A portable telephone set as claimed in claim 7, said receiving means receiving a second area identification signal transmitted from a second one of said base stations via the control channel when said portable telephone set removes from said first one of the radio zones to a second one of said radio zones for said second one of the base stations, wherein said portable telephone set further comprises renewing means, connected to said receiving means and said area identification holding means, for renewing the current area identification signal in said holding means by the second area identification signal.

* * * * *